United States Patent
Zhang et al.

(10) Patent No.: US 9,817,490 B2
(45) Date of Patent: Nov. 14, 2017

(54) PRESENTING USER INTERFACE BASED ON LOCATION OF INPUT FROM BODY PART

(71) Applicant: Lenovo (Singapore) Pte. Ltd., New Tech Park (SG)

(72) Inventors: Jianbang Zhang, Raleigh, NC (US); Jian Li, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 278 days.

(21) Appl. No.: 14/463,318

(22) Filed: Aug. 19, 2014

(65) Prior Publication Data

US 2016/0054818 A1    Feb. 25, 2016

(51) Int. Cl.
*G06F 3/0354* (2013.01)
*G06F 3/041* (2006.01)
*G06F 3/0488* (2013.01)

(52) U.S. Cl.
CPC ........ *G06F 3/03545* (2013.01); *G06F 3/0416* (2013.01); *G06F 3/0488* (2013.01); *G06F 2203/04104* (2013.01); *G06F 2203/04808* (2013.01)

(58) Field of Classification Search
CPC ...... G06F 3/041; G06F 3/0416; G06F 3/0488; G06F 3/04883; G06F 3/04886; G06F 3/044; G06F 2203/04808; G06F 2203/04104; G06F 3/03545; G06F 1/1626; G06F 3/0412
USPC .................................................. 345/169, 173
See application file for complete search history.

(56) References Cited

U.S. PATENT DOCUMENTS

| | | | | |
|---|---|---|---|---|
| 2003/0080946 A1* | 5/2003 | Chuang | ................ | G06F 3/0418 345/173 |
| 2008/0012835 A1* | 1/2008 | Rimon | .................... | G06F 3/038 345/173 |
| 2009/0327964 A1* | 12/2009 | Mouilleseaux | ....... | G06F 3/0482 715/834 |
| 2010/0192101 A1* | 7/2010 | Chmielewski | ........ | G06F 3/0482 715/834 |
| 2011/0242038 A1* | 10/2011 | Kakuta | ................. | G06F 3/0418 345/173 |
| 2011/0291944 A1* | 12/2011 | Simmons | .............. | G06F 3/0416 345/173 |
| 2012/0056900 A1* | 3/2012 | Park | .................... | G06F 3/04815 345/653 |
| 2012/0169611 A1* | 7/2012 | Chen | ................... | G06F 3/04886 345/173 |

(Continued)

*Primary Examiner* — Hong Zhou
(74) *Attorney, Agent, or Firm* — John L. Rogitz; John M. Rogitz

(57) ABSTRACT

In one aspect, a device includes a touch-enabled display, a processor, and a memory accessible to the processor. The memory bears instructions executable by the processor to receive first input from a body part of a user at a first location of the touch-enabled display and receive second input from a stylus at a second location of the touch-enabled display, where the second input is identified as a request to present a window on the touch-enabled display. The instructions are also executable to, at least in part based on the first location and the second location, present the window on the touch-enabled display at a third location on the touch-enabled display, where the third location is different from the first and second locations.

18 Claims, 7 Drawing Sheets

(56) References Cited

U.S. PATENT DOCUMENTS

| | | | |
|---|---|---|---|
| 2012/0182238 A1* | 7/2012 | Lee | G06F 3/0418 |
| | | | 345/173 |
| 2013/0135232 A1* | 5/2013 | Wang | G06F 3/041 |
| | | | 345/173 |
| 2013/0293495 A1* | 11/2013 | Choi | G06F 3/0488 |
| | | | 345/173 |
| 2014/0104225 A1* | 4/2014 | Davidson | G06F 3/044 |
| | | | 345/174 |
| 2014/0136411 A1* | 5/2014 | Cho | G06F 21/35 |
| | | | 705/44 |
| 2014/0210797 A1* | 7/2014 | Kreek | G06F 3/0488 |
| | | | 345/179 |
| 2015/0268743 A1* | 9/2015 | Takeuchi | G06F 3/03547 |
| | | | 345/157 |

* cited by examiner

| Size of Area | Distance |
|---|---|
| 1.27 cm² | 0.5 cm |
| 2.54 cm² | 2.0 cm |
| 5.08 cm² | 6.0 cm |

PRESENTING USER INTERFACE BASED ON LOCATION OF INPUT FROM BODY PART

FIELD

The present application relates generally to presenting a user interface on a touch-enabled display based on a location of input to the touch-enabled display from a body part of a person.

BACKGROUND

The location of input to a display of a device to present information on the display is sometimes used to determine the location of where the information is actually presented. However, such information when presented may nonetheless still be obstructed from viewing by other objects. There are currently no adequate and/or cost effective solutions to the foregoing.

SUMMARY

Accordingly, in one aspect a device includes a touch-enabled display, a processor, and a memory accessible to the processor. The memory bears instructions executable by the processor to receive first input from a body part of a user at a first location of the touch-enabled display and receive second input from a stylus at a second location of the touch-enabled display, where the second input is identified as a request to present a window on the touch-enabled display. The instructions are also executable to, at least in part based on the first location and the second location, present the window on the touch-enabled display at a third location on the touch-enabled display, where the third location is different from the first and second locations.

In another aspect, a method includes receiving, at a touch-enabled display of a device, first input from a body part of a person and second input from an input device. The method also includes, in response at least to the second input, presenting a user interface (UI) on the touch-enabled display at a first location different at least from a second location at which the first input was received.

In still another aspect, an apparatus includes a first processor, a network adapter, and storage bearing instructions executable by a second processor for receiving first input from a body part of a user at a first location of a touch-enabled display, receiving second input at a second location of the touch-enabled display to present a user interface (UI) on the touch-enabled display, and presenting the UI on the touch-enabled display at a third location on the touch-enabled display different from the first location. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
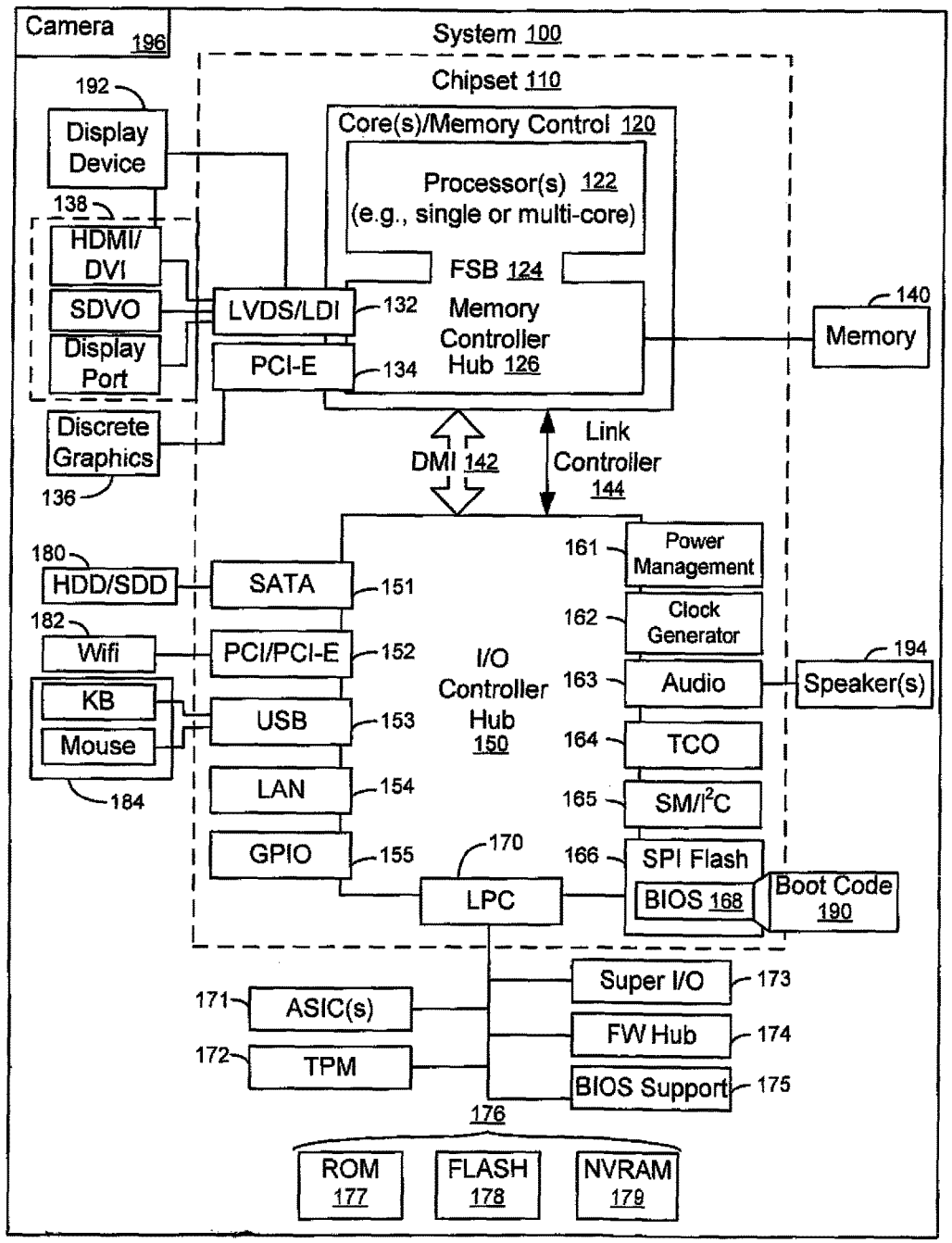
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCTE interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows a camera 196 for gathering one or more images and providing input related thereto to the processor 122 (e.g. images of a body part of a person hovering over the touch-enabled display 192). The camera may be, e.g., a thermal imaging camera, a digital camera such as a webcam, and/or a camera integrated into the system 100 and controllable by the processor 122 to gather pictures/images and/or video.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, and an audio receiver/microphone providing input to the processor 122 e.g. based on a user providing audible input to the microphone. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
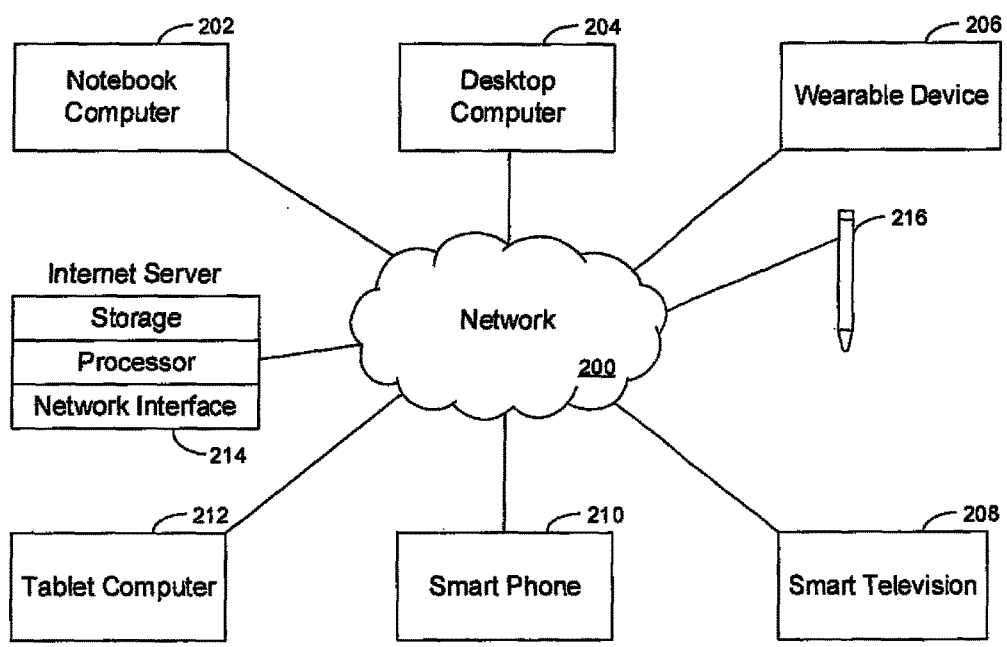
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, at least one input device 216 (e.g. a stylus and/or electronic pen configured for providing input (e.g. touch and/or hover input) to a touch-enabled display and/or touch-enabled pad, a wearable device (e.g. an input device engageable with a finger of a user) for providing input (e.g. touch and/or hover input) to a touch-enabled display and/or touch-enabled pad, etc.), and a server 214 such as e.g. an Internet server that may e.g. provide cloud storage accessible to the devices 202-212, and 216. Furthermore, it is to be understood that the devices 202-216 are configured to communicate with each other over the network 200 to undertake present principles.

Figure 3:
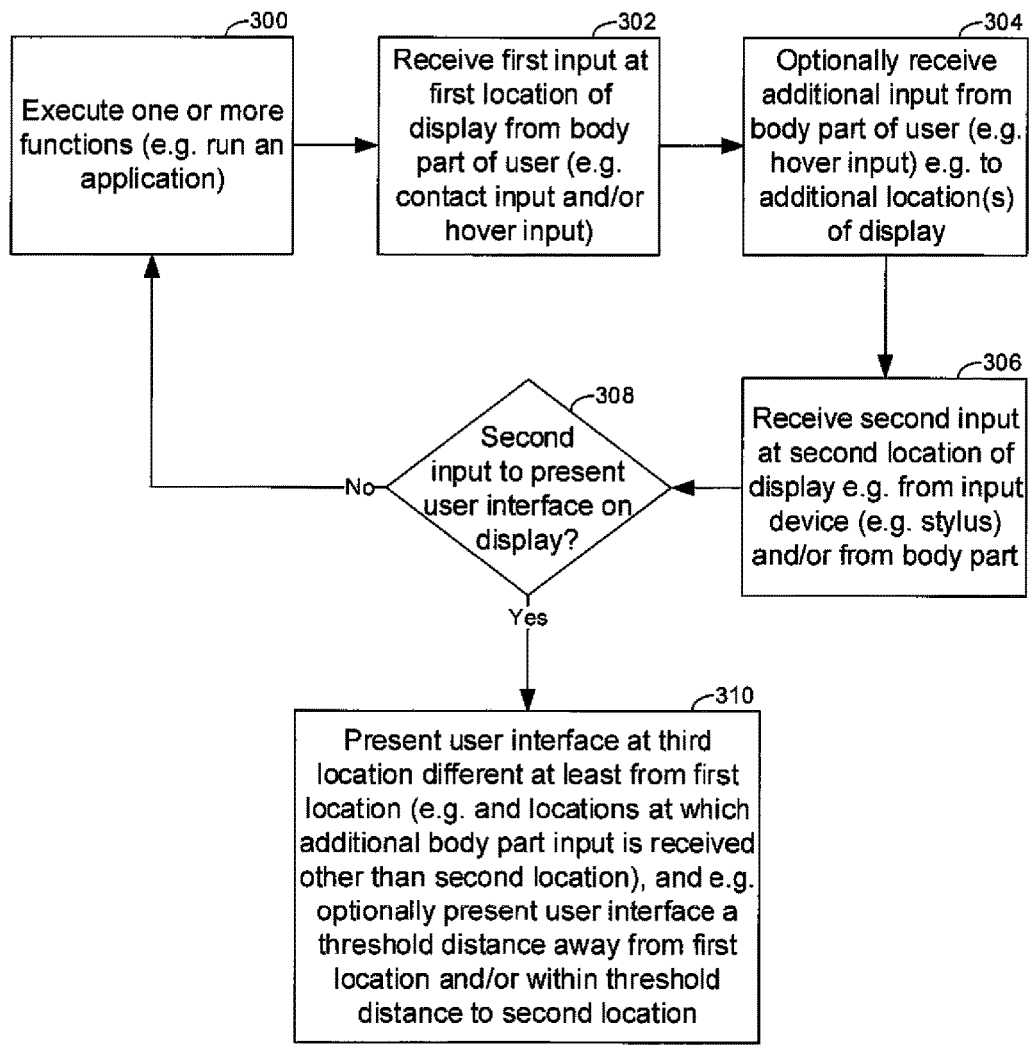
FIGS. 3, 4, and 6 are flow charts showing example algorithms in accordance with present principles.

Referring to FIG. 3, it shows example logic that may be undertaken by a device such as the system 100 in accordance with present principles (referred to below as the "present device"). Beginning at block 300, the logic executes one or more functions at the present device, such as e.g. running one or more applications such as e.g. a note taking application for receiving stylus input of handwriting from a user and representing the handwriting input in a window on a touch-enabled display of the present device. Another example of one or more functions that may be executed at the present device include e.g. running one or more background processes, and/or any software and/or logic for undertaking present principles.

In any case, after block 300 the logic continues to block 302 where the logic receives first input at a first location on the touch-enabled display from a body part of a user, such as e.g. input of the body part identified as contacting the touch-enabled display and/or input of the body part identified as hovering over the touch-enabled display (e.g. as identified using hover identification software and/or principles and/or sensors on the touch-enabled display, as well as e.g. using a camera gathering images for detecting and identifying the hover). After block 302 the logic proceeds to block 304 where the logic may optionally receive additional input from one or more body parts of one or more users at one or more additional locations of the touch-enabled display (e.g. other than at a second location to be described shortly), such as e.g. additional hover input.

From block 304 the logic continues to block 306 where the logic receives second input at a second location of the touch-enabled display e.g. from an input device such as a stylus and/or from a body part of a user. Thereafter, the logic proceeds to decision diamond 308 where the logic determines whether the second input is input (e.g. a request) to present a user interface (UI) and/or window on the touch-enabled display. A negative determination at diamond 308 causes the logic to move back to block 300 and proceed therefrom, while an affirmative determination at diamond 308 instead causes the logic to move to block 310.

At block 310 the logic presents the requested UI on the touch-enabled display at a third location on the touch-enabled display that is different at least from the first location (and e.g. locations at which the additional body part input was received at block 304 other than the second location). In some embodiments the UI may also be presented at a third location that is different not only from the first location but also the second location, while in other embodiments the UI may be presented at a third location that is different from the first location but includes the second location such that the UI is presented e.g. at least partially at the location at which the second input was received.

Also in some embodiments, the UI may be presented at block 310 e.g. at least threshold distance away from the first location (e.g. in some embodiments, the threshold distance may be defined by a user by manipulating a settings UI for establishing this threshold and/or any of the other thresholds described herein, as well as e.g. for establishing whether to process palm input differently from finger input as set forth further below in reference to FIG. 4) and/or may be presented within a threshold distance to the second location. Thus, e.g. the UI may be presented at or near the second location but be distanced from the first location to not be obstructed from view by the body part which provided or is providing the first input at the first location.

Continuing the detailed description in reference to FIG. 4, it shows example logic that may be undertaken by a device such as the system 100 in accordance with present principles (referred to below as the "present device") e.g. in conjunction with the logic of FIG. 3. Beginning at block 400, the logic receives input(s) from one or more body parts of one or more users as directed to and/or received at a touch-enabled display of the present device. The logic then proceeds to block 402, where the logic identifies data pertaining to an area of the touch-enabled display at which the input is received, including e.g. the dimensions of the area and/or the size of the area. Thereafter, the logic proceeds to decision diamond 404 where the logic determines whether the identified area is at or more than a threshold area amount (e.g. by accessing the threshold area amount as stored on a storage medium of the present device and comparing it to the identified area). This threshold amount may be defined by a user in some embodiments, but in any case may be established e.g. by a user to be greater than an area defined by input using the tip of any of the user's fingers (e.g. using a settings UI such as the one described above to provide input to a predefined area using each finger to thus calibrate the device accordingly). A negative determination at diamond 404 causes the logic to proceed to block 406, where the logic identifies the input received at block 400 as input from a finger of a user at least in part based on the determination and processes the input accordingly and/or as described herein.

However, an affirmative determination at diamond 404 instead causes the logic to proceed to block 408, at which the logic identifies the input received at block 400 as input from a at least a portion of a palm of a user (and/or a side of a hand of a user) at least in part based on the determination. From block 408 the logic proceeds to block 410 where the logic determines a location on the touch-enabled display for a UI to be presented (e.g. as requested, such as e.g. based on second input received at block 306 of FIG. 3 as described above) which is to be a distance away from the palm input based on the distance being correlated to the size of the identified area, and/or that is to be a threshold distance away from the identified area (e.g. both the distance away from the palm input that is correlated to the size of the identified area and the threshold distance may be defined by a user by manipulating a settings UI for establishing those two things). Furthermore, note that the distance away from the palm input that is correlated to the size of the identified area may be determined by the logic by e.g. accessing a data table correlating area amounts to distances, an example of which will be described below in reference to FIG. 5.

Figures 4, 5:
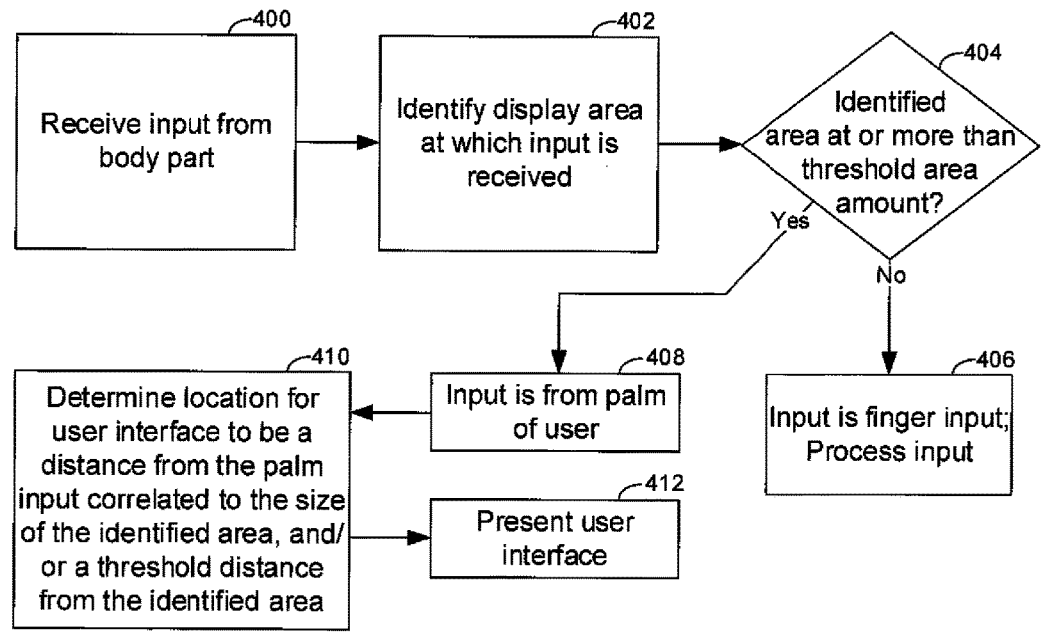
FIG. 5 is an example data table in accordance with present principles.

However, still in reference to FIG. 4, note that after block 410 the logic proceeds to block 412. At block 412 the logic presents the UI at the location determined at block 410.

Now in reference to the afore-mentioned FIG. 5, it shows an example data table 500 including a first column 502 containing entries for various sizes of areas of body part input detected by a touch-enabled display (e.g. that are each more than the area threshold described above in reference to FIG. 4) and a second column 504 containing entries for various distances at which to present (e.g. a nearest boundary of) a UI for the respective size of area for the respective entry. Thus, in the example shown an area size of one point two seven centimeters squared is correlated to a distance of half a centimeter, an area size of two point five four centimeters squared is correlated to a distance of two centimeters, and an area size of five point zero eight centimeters squared is correlated to a distance of six centimeters. It may now be appreciated that a device e.g. undertaking the logic of FIG. 4 may at block 410 access the data table 500 and compare the identified area to one or more entries in the column 502 until a match is identified, and then access the corresponding distance in the column 504 for the matched entry to thus identify and use this distance as disclosed herein.

Figure 6:
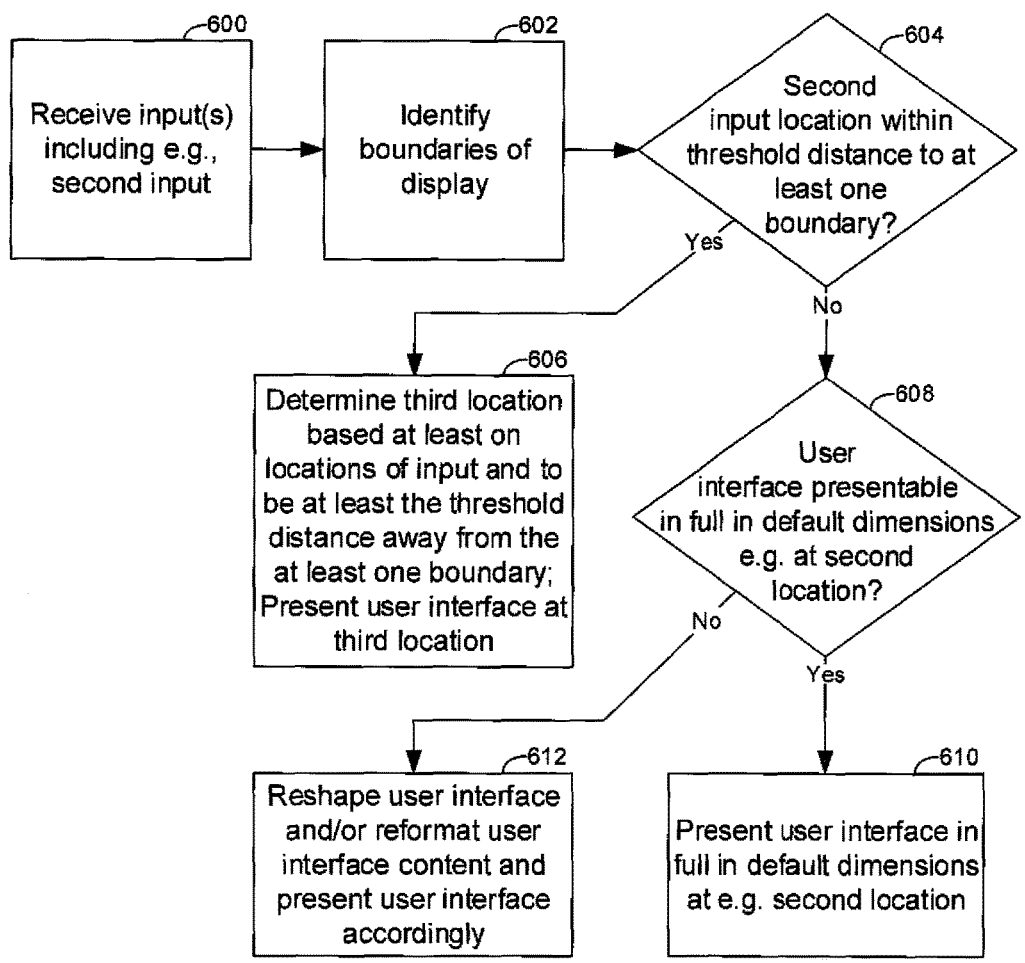

Before moving on to the description of FIG. 6, it is to be understood that the data table 500 is an example and that more or less entries may be contained in such a data table, including e.g. entries for sizes of areas other than those shown. Furthermore, in some embodiments the column 502 may contain size ranges rather than one size for each entry. Thus, e.g. areas from e.g. half a centimeter squared to one point two seven centimeters squared may be correlated to a distance of half a centimeter. Also, note that in some embodiments such a data table may be configurable by a user such that e.g. the user may define area sizes and/or ranges and distances which are to respectively correspond to such area sizes and/or ranges. What's more, it may be appreciated based on the example FIG. 5 that the correlations need not necessarily be linear and that e.g. for greater areas the respective distances may increase exponentially.

Still further before moving on to the description of FIG. 6, it is to be understood that in addition to or in lieu of using area size for determining whether input that is received at a touch-enabled display is from a palm and/or side of hand of a user, such may be determined e.g. using recognizable and/or identifiable hand and skin patterns (e.g. and/or the lack thereof, such as the lack of an identifiable finger print) based on e.g. a user previously configuring the device to recognize particular hand and skin patters for the particular user. Also in addition to or in lieu of the foregoing, the shape and/or dimensions of the input area may also be used for such a determination, such that e.g. a relatively crescent shaped input area against a touch-enabled display as identified by the device may be identified as a side of a hand or a palm of a user as opposed to a finger (e.g. a finger tip, specifically, which may be more circle-like or oval-like).

Reference is now made to FIG. 6, which shows example logic that may be undertaken by a device such as the system 100 in accordance with present principles (referred to below as the "present device") e.g. in conjunction with the logic of FIGS. 3 and 4. Beginning at block 600, the logic receives one or more inputs directed to a touch-enabled display of the present device, including e.g. the second input described above in reference to FIG. 3 e.g. identified as a request to present a UI and/or window in accordance with present principles. The logic then moves to block 602 where the logic identifies one or more boundaries of the touch-enabled display (e.g. based on data regarding such boundaries being stored at a location accessible to the present device).

The logic then proceeds to decision diamond 604, at which the logic determines whether the location at which the second input is received is within a (e.g. user-defined) threshold distance to at least one of the boundaries. An affirmative determination at diamond 604 causes the logic to proceed to block 606, where the logic determines a location (e.g., the third location described above in reference to FIG. 3) at which to present the UI based at least on locations of receipt of one or more inputs (e.g. the first and additional input described above in reference to FIG. 3) and to be at least the threshold distance away from each respective boundary. Also at block 606, the logic presents the UI at the location determined thereat.

Referring back to diamond 604, should a negative determination instead be made thereat, the logic instead proceeds to decision diamond 608. At diamond 608, the logic determines whether the UI is presentable in full (e.g. without having to reshape the UI from its default dimensions, without having to adjust a default configuration of presentation of its contents, and/or without the UI appearing to extend offscreen such that only a part of it is presented owing to a boundary of the touch-enabled display) at a location such as e.g. the third location disclosed in reference to FIG. 3 and/or the second location disclosed in reference to FIG. 3 in embodiments where the UI may be presented at least partially at the location of the second input requesting the UI.

An affirmative determination at diamond 608 causes the logic to proceed to block 610, where the logic presents the UI in full in its default dimensions and/or other default configurations (e.g. default configuration of presentation of its contents) at e.g. the second location. However, a negative determination at diamond 608 instead causes the logic to proceed to block 612, at which the logic reshapes the UI and/or reformats the content of the UI (e.g. so that it may be presented near the boundary at or proximate to the location at which the request for presentation of the UI was received while still conforming to the thresholds discussed above (e.g. the threshold distance away from each respective boundary and/or within a threshold distance to the location of the input requesting presentation of the UI)) and presents the UI according to the reshaping and/or reformatting.

For instance, assume default dimensions for such a UI are rectangular with a width of the rectangle greater than the height. If the location at which the rectangular UI is to be presented is not presentable in full at the location per its defaults, the device may identify as much and may reshape the UI to still be rectangular but e.g. having a height greater than its width. Also in such an instance, if e.g. there were three columns of content in the UI when presented in the default dimensions, the content may be reformatted (e.g. without pruning or removing any of the content) to e.g. be presented in one or two columns in the relatively less wide reshaped UI. In this respect, e.g. the content within such a UI may be considered dynamically presentable.

Still further, note that reshaping of a UI in accordance with present principles may include reshaping a UI from a first shape to a second shape different from the first shape, such as e.g. reshaping the UI from a circle to a rectangle and vice versa.

Figure 7:
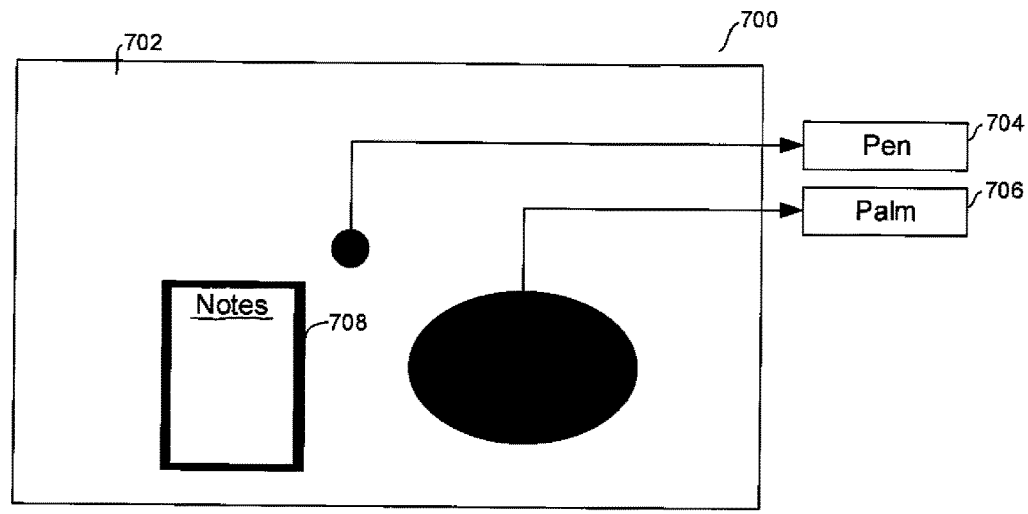
FIG. 7-9 are example illustrations in accordance with present principles.

Continuing the detailed description in reference to FIG. 7, it shows an example illustration 700 of present principles. The illustration 700 shows a touch-enabled display 702, along with shading 704 representing a location at which pen (e.g. an electronic pen) input was detected by the touch-enabled display 702 and shading 706 representing a location at which palm input was detected by the touch-enabled display 702. Based on the locations represented by the shadings 704 and 706, a UI 708 is presented for providing handwriting input to the device using the UI 708 (e.g. in response to receipt of the input represented by the shading 704 which was identified as input requesting presentation of the UI 708).

Accordingly, it may be appreciated based on the foregoing description of FIG. 7 that the illustration 700 may be for an instance e.g. where a user is holding a pen while also resting their palm or another portion of their hand on the touch-enabled display 702. A UI such as a pop-up note taking window may thus be presented e.g. within a threshold distance to the location represented by the shading 704 but is also not presented at a location covered by and/or obstructed from viewing by the user's palm.

Figure 8:
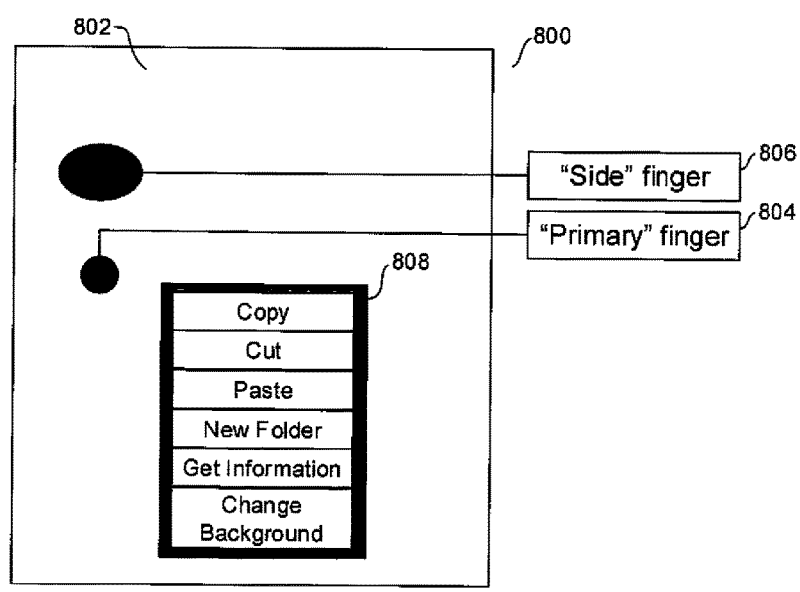

Now in reference to FIG. 8, it shows an example illustration 800 of present principles. The illustration 800 shows a touch-enabled display 802, along with shading 804 representing a location at which touch input using a body part was detected by the touch-enabled display 802 and shading 806 also representing a location at which touch input using a body part was detected by the touch-enabled display 802. Based on the locations represented by the shadings 804 and 806, a context UI 808 is presented for selecting one or more options therefrom (e.g. the UI 808 being presented in response to receipt of the input represented by the shading 804 which was identified as input requesting presentation of the UI 808). Thus, note that the input represented by the shading 804 may be identified in the present example as e.g. so-called "right-click" input to present a context menu and/or UI on a display for taking actions such as a cut, copy, or paste action, as well as for creating a new folder at the location represented by the shading 804, retrieving information on an item presented at the location represented by the shading 804, and/or changing a background image (e.g. when no such item is presented at the location represented by the shading 804 but only a background and/or desktop image).

Accordingly, it may be appreciated based on the foregoing description of FIG. 8 that the illustration 800 may be for an instance e.g. where a user is holding the device at least in part using a finger contacting the display 802 at the location represented by the shading 806 while navigating what is presented on the display 802 and/or providing commands and/or requests to the display 802 using a finger contacting the display 802 at the location represented by the shading 804. Thus, the context UI 808 is presented at or near the location represented by the shading 804 but is also not presented at a location covered by and/or obstructed from viewing by the finger being used to hold the device.

Figure 9:
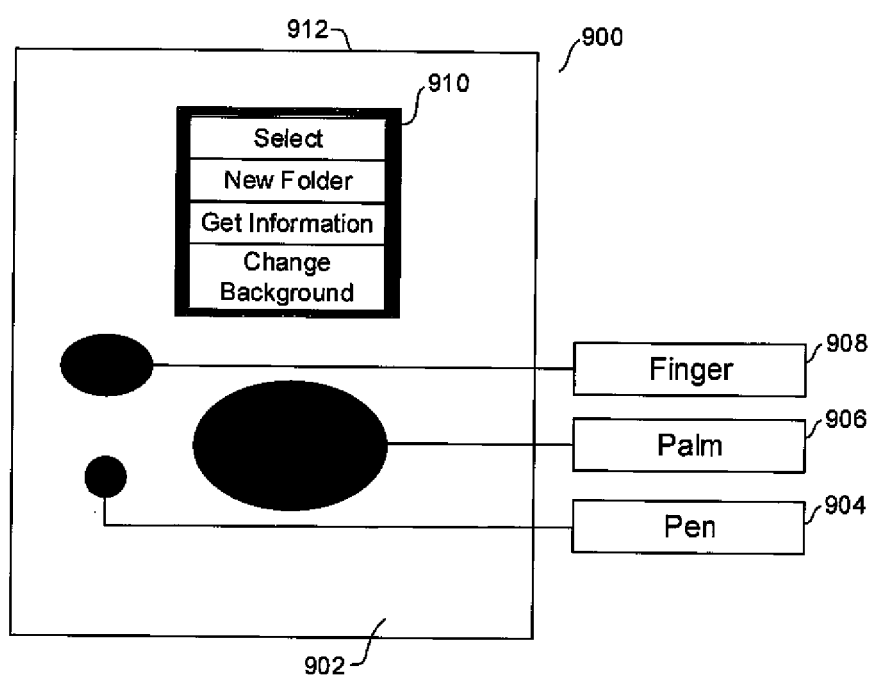

Describing FIG. 9, it shows an example illustration 900 of present principles. The illustration 900 shows a touch-enabled display 902, along with shading 904 representing a location at which pen (e.g. an electronic pen) input was detected by the touch-enabled display 902, shading 906 representing a location at which palm input was detected by the touch-enabled display 902, and shading 908 representing a location at which finger input was detected by the touch-enabled display 902. Based on the locations represented by the shadings 904, 906, and 908, a context UI 910 is presented for selecting one or more options therefrom (e.g. the UI 910 being presented in response to receipt of the input represented by the shading 904 which was identified as input requesting presentation of the UI 910). Thus, note that the input represented by the shading 904 may be identified in the present example as e.g. so-called "right-click" input to present a context menu and/or UI on a display for taking actions such as a select action, as well as for creating a new folder at the location represented by the shading 904, retrieving information on an item presented at the location represented by the shading 904, and/or changing a background image (e.g. when no such item is presented at the location represented by the shading 804 but only a background and/or desktop image).

Furthermore, it is to be understood that in the example shown in FIG. 9, the context UI 910 may be a reshaped and reformatted version of the context UI 808 discussed in reference to FIG. 8, it being reshaped and reformatted owing to its proximity to a display border 912 in accordance with present principles, where e.g. the UI 808 represents default dimensions and a default content configuration for the context UI. Thus, note that the context UI as shown in FIG. 9 has been reshaped to be relatively wider and relatively shorter than the context UI as shown in FIG. 8, and furthermore that its content has been altered to include some of the same selector elements as the context UI as represented in FIG. 8 but with the copy, cut, and paste selector elements replaced by a single select selector element owing to e.g. the limited amount of display space the device has to present the UI 910 within a threshold distance to the location represented by the shading 904 while still not being obstructed because of the positions of the user's palm (and/or other portions of an arm that are detected) and finger (which although represented as respective shadings 906 and 908 may still be present and contacting and/or hovering over the display 902) and while being presented in full despite proximity to the boundary 912.

Accordingly, it may be appreciated based on the foregoing description of FIG. 9 that the illustration 900 may be for an instance e.g. where a user is hovering at least a portion of their palm and/or side of hand at a detectable distance above the display 902 and using another hand to hold their device where the finger of the other hand also contacts the display 902 as represented by the shading 908, while also providing pen input to present a UI as represented by the shading 904. The context UI 910 is presented at or near the location represented by the shading 904 but is also not presented at a location covered by and/or obstructed from viewing by the finger being used to hold the device and the palm resting on the device.

Without reference to any particular figure, it is to be understood that in addition to the foregoing description for parameters (e.g. the thresholds) to use for presenting a UI at or near a boundary, also note that e.g. should not enough space owing to a boundary be available to present a UI e.g. to the left of a control point (e.g. a location at which input is received, such as input to present the UI), a device in accordance with present principles may instead present the UI to the right of the control point (or another opposite side, such as e.g. if to be presented above a control point save for the lack of needed space the UI may be presented below the control point instead).

It may now be appreciated that present principles provide for using e.g. multipoint touch technology and/or principles to detect a user's palm contact position, finger contact position, and stylus contact position, and identify corresponding areas of the display to which the input is directed. A pop up window may thus be dynamically controlled based on such control points to position and layout the pop up window according to the multiple control points and their relative relationship (e.g. to each other) as well as according to display areas and/or display boundaries.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular PRESENTING USER INTERFACE BASED ON LOCATION OF INPUT FROM BODY PART is herein shown and described in detail, it is to be understood that the subject matter which is encompassed by the present application is limited only by the claims.

What is claimed is:

1. A device, comprising:
a processor;
a touch-enabled display accessible to the processor; and
a memory accessible to the processor and bearing instructions executable by the processor to:
receive first input from a body part of a user at a first location of the touch-enabled display;
identify a size of an area of the touch-enabled display at which the first input is received;
receive second input from a stylus at a second location of the touch-enabled display, the second input identified as a request to present a window on the touch-enabled display; and
at least in part based on the size of the area, present the window on the touch-enabled display at a third location on the touch-enabled display different from the first and second locations;
wherein the instructions are executable by the processor to determine the third location to be more than a threshold distance from the first location;
wherein the window is a first window, and wherein the threshold distance is established at least in part based on receipt of user input at a second window presented on the touch-enabled display.

2. The device of claim 1, wherein the instructions are further executable to:
identify the first input as input from a palm of a hand of a user; and
in response to identification of the first input as input from a palm of a hand of a user, present the first window on the touch-enabled display at the third location.

3. The device of claim 1, wherein the instructions are further executable to:
determine whether the first window is presentable in full in default dimensions at the third location; and
in response to a determination that the first window is not presentable in full in the default dimensions at the third location, reshape the first window to have first dimensions different from the default dimensions and present the first window at the third location in the first dimensions.

4. The device of claim 1, wherein the instructions are executable by the processor to:
at least in part based on the size of the area, identify a distance away from the first location at which the first window is to be presented on the touch-enabled display.

5. The device of claim 4, wherein the distance is identified at least in part based on data accessible to the processor that correlates area sizes to respective distances.

6. The device of claim 4, wherein the distance is identified based at least in part on the size of the area and based at least in part on user input establishing at least one relationship between at least one input area size and at least one distance.

7. The device of claim 6, wherein the user input establishing the at least one relationship between the at least one input area size and the at least one distance is received at the second window presented on the touch-enabled display, the second window being different from the first window.

8. A method, comprising:
receiving, at a touch-enabled display of a device, first input from a body part of a person and second input from an input device;
determining a size of an area of the touch-enabled display at which the first input is received; and
in response at least to the second input and at least in part based on the size of the area, presenting a user interface (UI) on the touch-enabled display at a first location different at least from a second location at which the first input was received;
wherein the method comprises determining the first location to be more than a threshold distance from the second location;
wherein the UI is a first UI, and wherein the threshold distance is established at least in part based on receipt of user input at a second UI presented on the touch-enabled display.

9. The method of claim 8, wherein the first UI is a context menu.

10. The method of claim 8, wherein the method comprises:
at least in part based on the size of the area, determining a distance away from the second location at which the first UI is to be presented.

11. The method of claim 10, wherein the distance is determined at least in part by accessing data correlating input area sizes to respective distances.

12. The method of claim 10, wherein the distance is determined based at least in part on the size of the area and based at least in part on user input establishing at least one relationship between at least one input area size and at least one distance.

13. The method of claim 12, wherein the user input establishing the at least one relationship between the at least one input area size and the at least one distance is received at the second UI.

14. An apparatus, comprising:
a first processor;
a network adapter;
storage bearing instructions executable by a second processor for:
receiving first input from a body part of a user at a first location of a touch-enabled display;
receiving second input at a second location of the touch-enabled display to present a user interface (UI) on the touch-enabled display;
identifying an area of the touch-enabled display at which the first input is received;
based on the size of the area, presenting the UI a distance away from the first location on the touch-enabled display at a third location on the touch-enabled display different from the first location;
wherein the instructions are executable by the second processor for determining the third location to be more than a threshold distance from the first location;
wherein the UI is a first UI, and wherein the threshold distance is established at least in part based on receipt of user input at a second UI presented on the touch-enabled display;
wherein the first processor transfers the instructions to the second processor over a network via the network adapter.

15. The apparatus of claim 14, wherein the first input is identified as input from a body part of a user hovering over the touch-enabled display, and wherein the second input is identified as input from a body part of a person contacting the touch-enabled display.

16. The apparatus of claim 14, wherein the instructions are executable by the second processor for:
based on the size of the area, identifying the distance away from the first location;
identifying the third location at least in part based on the distance; and
presenting the first UI at the third location.

17. The apparatus of claim 14, wherein the distance is identified based at least in part on the size of the area and based at least in part on user input establishing at least one relationship between at least one input area size and at least one distance.

18. The apparatus of claim 17, wherein the user input establishing the at least one relationship between the at least one input area size and the at least one distance is received at the second UI.

* * * * *